C. L. LANDON.
TIRE MAKING MACHINE.
APPLICATION FILED AUG. 11, 1919.
1,419,064.
Patented June 6, 1922.
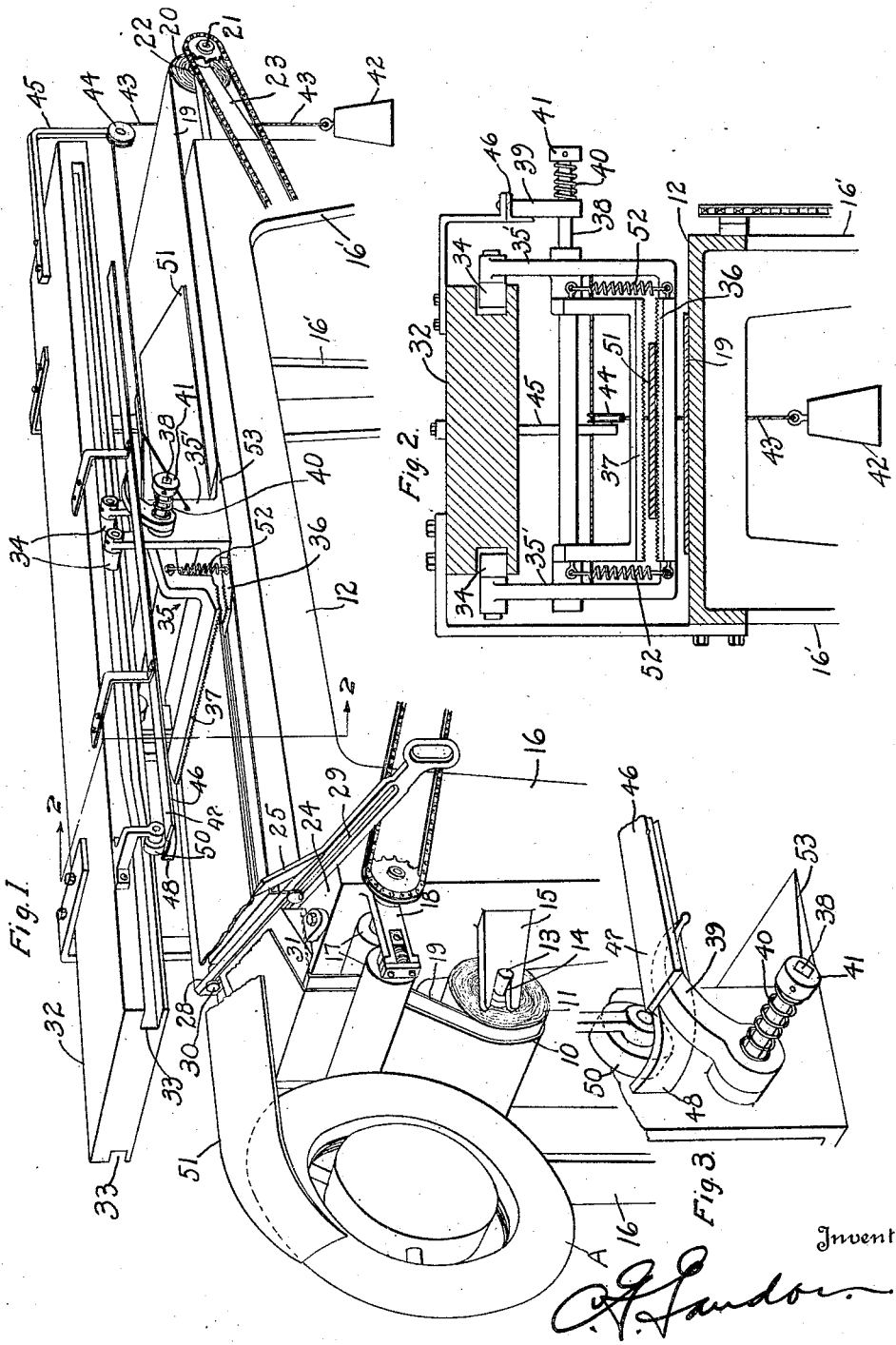
Inventor
C. L. Landon

UNITED STATES PATENT OFFICE.

CHAUNCEY L. LANDON, OF AKRON, OHIO, ASSIGNOR TO THE GOODYEAR TIRE & RUBBER COMPANY, OF AKRON, OHIO, A CORPORATION OF OHIO.

TIRE-MAKING MACHINE.

1,419,064.  Specification of Letters Patent.  Patented June 6, 1922.

Application filed August 11, 1919. Serial No. 316,811.

*To all whom it may concern:*

Be it known that I, CHAUNCEY L. LANDON, a citizen of the United States, and resident of Akron, Ohio, have invented new and useful Improvements in Tire-Making Machines, of which the following is a specification.

My present invention relates to tire making machines and more particularly to apparatus for governing the application of the fabric to the tire forming apparatus.

The many important objects and advantages of my invention will be apparent from a perusal of the specification and claims together with the appended drawings in which—

Figure 1 is a perspective view of my device;

Figure 2 is a sectional view on the line 2—2 of Figure 1; and

Figure 3 is a detailed perspective of the trip mechanism.

The apparatus embodying my invention is arranged adjacent to and adapted to be combined with the usual or any suitable means for effecting, at will, rotation of a tire carcass forming core.

Broadly considered, the apparatus comprises means for cutting a strip of tire fabric into lengths or plies suitable for building a tire carcass on the forming core, and means adapted to automatically grip the cut lengths or plies of fabric and hold them yieldingly as they are pulled by, and wound onto the forming core.

Considered more specifically, the apparatus consists of mechanism for feeding the strip of fabric, a device for cutting the fabric when it has been fed and a movably mounted device adapted to automatically grip the length of fabric cut off of the strip and resistingly yield toward the forming core while the fabric is being wound onto the forming core.

In the form of the apparatus shown in the drawings, a strip of rubberized fabric 10, is, previous to application to the apparatus, wound on a stock roll 11. This stock roll 11 is preferably arranged in a rotatable manner at the forward end of a table 12 disposed in alignment with a forming core A, and it may be provided with gudgeons 13 adapted to fit in slots 14 in the ends of arms 15 extending forwardly and upwardly from a support 16 forming a part of the table 12. From the stock roll 11 the fabric 10 is intermittently passed to the table 12 by feed rollers 17 or any other suitable means, in a manner later to be described.

As shown, the feed rollers 17 are arranged above the stock roll 11 and rotatably mounted in brackets 18 at the forward end of the support 16. When, as in this instance, the fabric 10 is rubberized, it may be placed on a liner 19 to prevent sticking together of adjacent portions of the fabric. A take-up roll 20 for the liner 19 is rotatably arranged at the rear end of the table 12 and it is provided with gudgeons 21 fitted in bearing 22 in the ends of forwardly and upwardly extending arms 23 of a support 16'. The forward end portion of the table 12 is formed with a stepped-down portion 24 on which is slidably arranged a cutting blade 25.

In order to cut the fabric on the bias, as is customary in forming plies for a tire carcass, the vertical wall, designated as 28, at the rear of the stepped-down portion 24 is disposed at an angle of approximately 45 degrees to the side edges of the strip of fabric 10 which is, as already stated, fed onto the table 12. The cutting blade 25 is spaced a short distance from and movable parallel to the vertical wall 28; and it is provided with longitudinal slots 29 through which extend shouldered pins 30 attached to the vertical wall 28 and adapted to guide the cutting blade 25 in its movement. The upper edge of the cutting blade 25 is beveled, which permits the fabric 10 to move freely thereover without being cut while the blade is not moving. When, however, the blade 25 is operated to move crosswise the beveled edge is adapted to act as one of the cutting surfaces to cut the fabric.

A stripping bar 31 is stationarily arranged adjacent to the cutting blade 25, and it is adapted to separate the fabric 10 from the liner 19. This stripping bar 31 guides the fabric 10 to cause the fabric to pass over the upper edge of the blade 25, and it also guides the liner 19 to cause it to pass under the lower edge of the blade.

Above the table 12 is stationarily arranged a guide 32 provided, in its sides, with longitudinal grooves 33 in which are fitted rollers 34 carried upon the upper end of the side portions 35' of a fabric gripping device 35. The latter has a lower stationary jaw 36 formed integral with the side portions 35′, and has its upper jaw 37 pivotally mounted thereto. One of the pivots of the upper jaw 37 has thereon a squared extension 38 on which is slidably mounted the lower part of an upwardly and rearwardly curved finger 39. A coil spring 40 surrounds the extension 38 and extends between the finger 39 and a collar 41 fixed on the extension 38. The fabric gripping device is moved to, and normally held in its retracted position, at the rear of the table 12 by means of a weight 42, to which is connected a cable 43 passed over a sheave 44 and connected to the side portions 35′ of the gripping device. The sheave 44 is rotatably mounted in a bracket 45 at the rear end of the guide 32. To the guide 32 is connected an angle iron or cam bar 46 which extends parallel to the guide 32 but is arranged at a lower level than the guide, and is spaced laterally from one side thereof. At its forward end the angle iron or cam bar 46 has its vertical wall 48 curved toward the guide 32. The grooves 33 of the guide 32 are offset downwardly at the forward end in order to cause the fabric gripping device to pass to a lower level when it reaches the forward end of its movement.

When the fabric gripping device is moved forwardly the finger 39 travels in the space between the guide 32 and the angle iron or cam bar 46, and when the fabric gripping device reaches the forward end of the guide 32 the finger 39 strikes a roller 50 and is thereby moved downwardly to effect separation of the jaw 37 from the jaw 36 to release the ply of fabric 51 which is being wound on the forming core A. Upon the release of the ply of fabric 51 the weight 42 acts to retract the fabric gripping device and the finger 39 contacts with the vertical wall 48, being thereby moved laterally on the extension 38; and the forward end portion 47 of the horizontal wall of the cam bar 46 moves the finger 39 so that the cam bar depresses the finger 39 until the fabric gripping device has reached the limit of its rearward movement, where the finger passes out of contact with the cam bar and permits the jaw 37 to be moved toward the jaw 36 through action of a spring 52 connected between the jaws. The jaw 36 is provided on its rear with an extension 53 which slopes downwardly and is adapted to pass under the cut-off ply of fabric when the fabric gripping device is moved rearwardly.

The operative connections of the feed rollers 17, liner roll 20, and cutting blade 25 are such that the liner 19 is intermittently taken up and a length or ply 51 of the fabric 10 is fed onto the table 12 and cut while the fabric gripping device is being moved forwardly over the same.

While the fabric gripping device is moving rearwardly, the jaw 36 travels under the cut-off ply 51 of fabric, and the jaw 37 travels above the ply; the jaw 37 being separated from the jaw 36 by contact of the finger 39 with the cam bar 46, as previously explained. In the fully retracted position of the fabric gripping device, the finger 39 is out of contact with the cam bar 46 and the rear end of the ply 51 of fabric is gripped by the jaws 36 and 37 so that the forward end of the ply 51 can now be connected to the forming core A, and the latter can be rotated to wind the ply thereon; the fabric, during the winding operation, being held taut and stretched through the action of the weight 42 connected to the fabric gripping device.

What I claim is:

1. In combination with a table and a rotatable core adapted to wind a strip of material from the table, of reciprocatory mechanism for gripping the free end of the material to tension the strip as it is wound upon the core, and means for automatically actuating said mechanism to release the fabric when the winding operation is substantially completed.

2. The combination with a table and a rotatable core adapted to wind a strip of material from the table, of reciprocatory mechanism for gripping the free end of the material to tension the strip during the winding operation, and means for automatically actuating said mechanism to successively grip and release the fabric at the end of each stroke.

3. The combination with a table and a rotatable core adapted to wind a strip of material from the table, of reciprocatory gravity returned mechanism for gripping the free end of the material to tension the strip as it is wound upon the core, and means for automatically actuating said mechanism to release the fabric when the winding operation is substantially completed.

4. The combination with a table and a rotatable core adapted to wind a strip of material from the table, of reciprocatory gravity returned mechanism for gripping the free end of the material to tension the strip during the winding operation, and means for automatically actuating said mechanism to successively grip and release the fabric at the end of each stroke.

5. The combination with a table and a rotatable core adapted to wind a strip of material from the table, of reciprocatory devices adapted to grip the free end of the material to tension the strip during the winding operation, and means for effecting movement of said devices in a plurality of planes during its forward and return stroke.

6. The combination with a table and a rotatable core adapted to wind a strip of material from the table, of gravity returned reciprocatory devices adapted to grip the free end of the material to tension the strip during the winding operation, and means for effecting movement of said devices in a plurality of planes during its forward and return stroke.

7. The combination with a table and a rotatable core adapted to wind a strip of material from the table, of reciprocatory devices adapted to grip the free end of the material to tension the strip during the winding operation, means for effecting movement of said devices in a plurality of planes during its forward and return stroke, and means for automatically actuating said devices to successively grip and release the fabric at the end of each stroke.

8. In a tire building machine, a table, means adapted for feeding a supply of lined fabric thereon, a manually operated cutting element arranged upon the table to effect a biased cut upon the fabric, and means for separating the fabric and liner and guiding them in different planes respectively above and below the element.

9. In a tire building machine, a table, means adapted to feed a supply of lined fabric thereon, means for reeling up the liner, a manually slidable cutting element arranged to effect a bias cut upon the fabric, and a wedge shaped guide for separating the fabric and liner and guiding them in different planes respectively above and below the cutting element.

10. Apparatus for operating on fabric to build a tire carcass on a forming core, comprising the combination of a table, means for feeding a strip of fabric to place a length thereof on the table, means for cutting the length of fabric from a strip, and means whereby a length of fabric is held taut and stretched in a longitudinal direction while the length of fabric is being wound on the forming core.

11. Apparatus of the character specified, comprising the combination of means for cutting from a strip of fabric a length suitable for building a tire carcass on a forming core, and reciprocatory means adapted to automatically grip the length of fabric and hold it yieldingly as it is wound onto the forming core.

12. Apparatus of the character specified, comprising the combination of a table, means for feeding a strip of fabric to place on the table a length of the fabric suitable for building a tire carcass on a forming core, means for cutting the length of fabric off of the strip, and reciprocatory means adapted to automatically grip the length of fabric and hold it yieldingly as it is wound onto the forming core.

13. Apparatus of the character specified, comprising the combination of a table, means for feeding a strip of fabric to place on the table a length of the fabric suitable for use in building a tire carcass on a forming core, a device for cutting the length of fabric off of the strip, and a movably mounted device adapted to automatically grip the length of fabric and resistingly yield toward the forming core while the length of fabric is being wound onto the forming core.

14. Apparatus of the character specified, comprising the combination of a table, means for feeding a strip of fabric to place on the table a length of the fabric suitable for use in building a tire carcass on a forming core, means for cutting the length of fabric off of the strip, fabric gripping means comprising separable jaws movable toward and away from the core and adapted to resistingly yield in their movement toward the core while the fabric is being wound thereon, and means to separate the jaws to permit the length of fabric to pass there-between when the device is moved away from the forming core.

15. Apparatus of the character specified, comprising the combination of a table, means for feeding a strip of fabric to place on the table a length of the fabric suitable for use in building a tire carcass on a forming core, means for cutting the length of fabric off of the strip, a guide, a device movably mounted on the guide and including jaws adapted to grip the length of fabric and hold it as it is wound onto the forming core, means to move the device away from the forming core, and means to separate the jaws to permit the length of fabric to pass there-between when the device is moved away from the forming core.

16. Apparatus of the character specified, comprising the combination of a table, means for feeding a strip of fabric to place on the table a length of the fabric suitable for use in building a tire carcass on a forming core, a guide, a device movably mounted on the guide including jaws adapted to grip the length of fabric and hold it as it is wound onto the forming core, means to move the device away from the forming core, and cooperating devices on the guide and the jaws for automatically operating the jaws to release the fabric.

17. Apparatus of the character specified, comprising a table, means for feeding a strip of fabric to place on the table a length of the fabric suitable for use in building a tire carcass on a forming core, means for cutting a length of fabric off of the strip, a guide, a device movably mounted on the guide including jaws adapted to grip the length of fabric and hold it as it is wound onto the forming core, a cam bar, retracting means connected to the device, and means including a spring-pressed finger operatively connected to the device and adapted to co-act with the cam bar to separate the jaws to permit the length of fabric to pass between the jaws when the device is moved away from the forming core.

In witness whereof, I have hereunto signed my name in the presence of two subscribing witnesses.

CHAUNCEY L. LANDON.

Witnesses:
    JOHN E. KEATING,
    L. M. HARTMAN.